Figure 1:
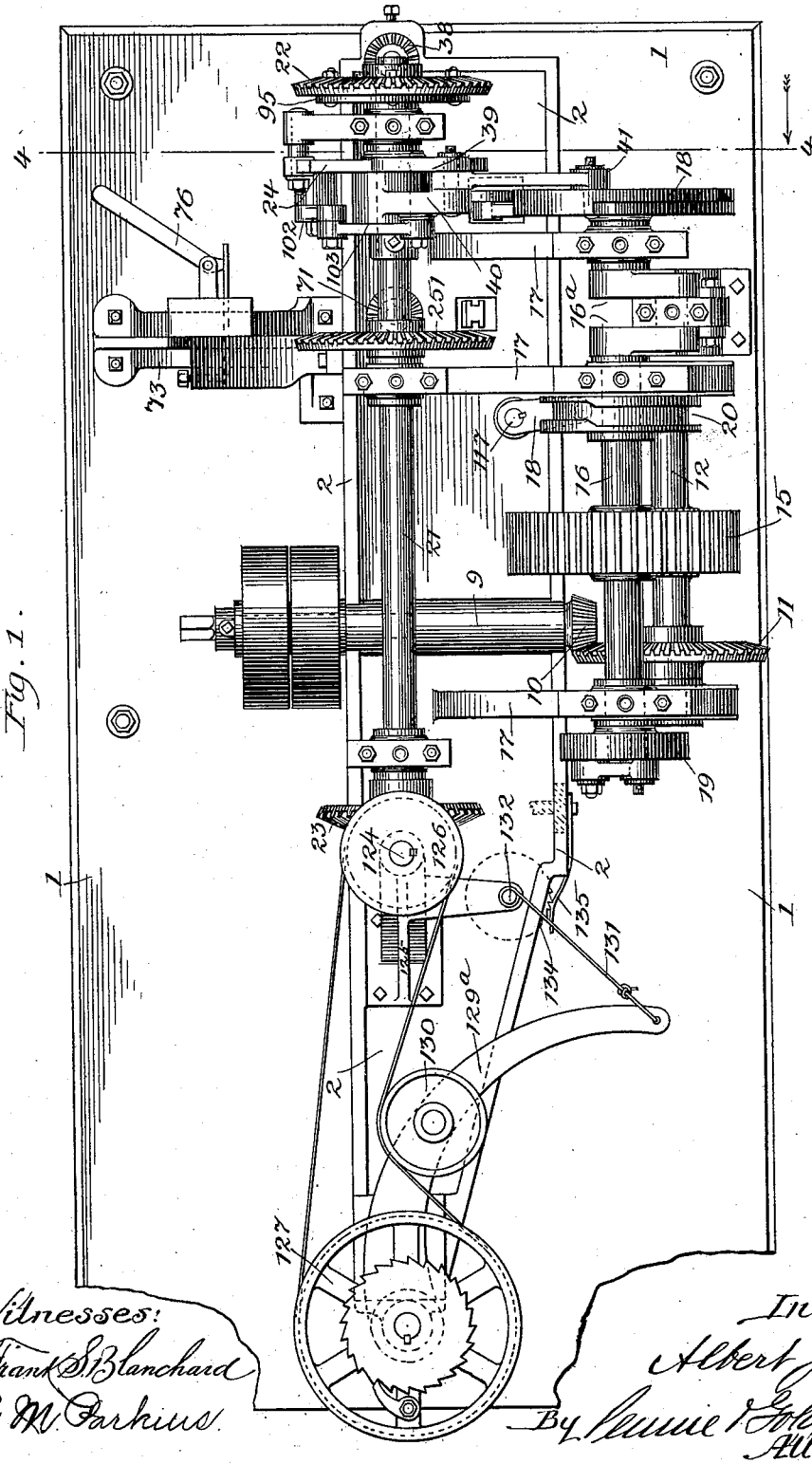

(No Model.)　　　　　　　　　　　　　　　　　　11 Sheets—Sheet 1.
A. J. BATES.
MACHINE FOR MAKING WIRE FENCING.

No. 591,996.　　　　　　　　　　Patented Oct. 19, 1897.

Witnesses:
Frank S. Blanchard
A. M. Parkins

Inventor:
Albert J. Bates,
By Jennie? Goldsborough
Attorneys.

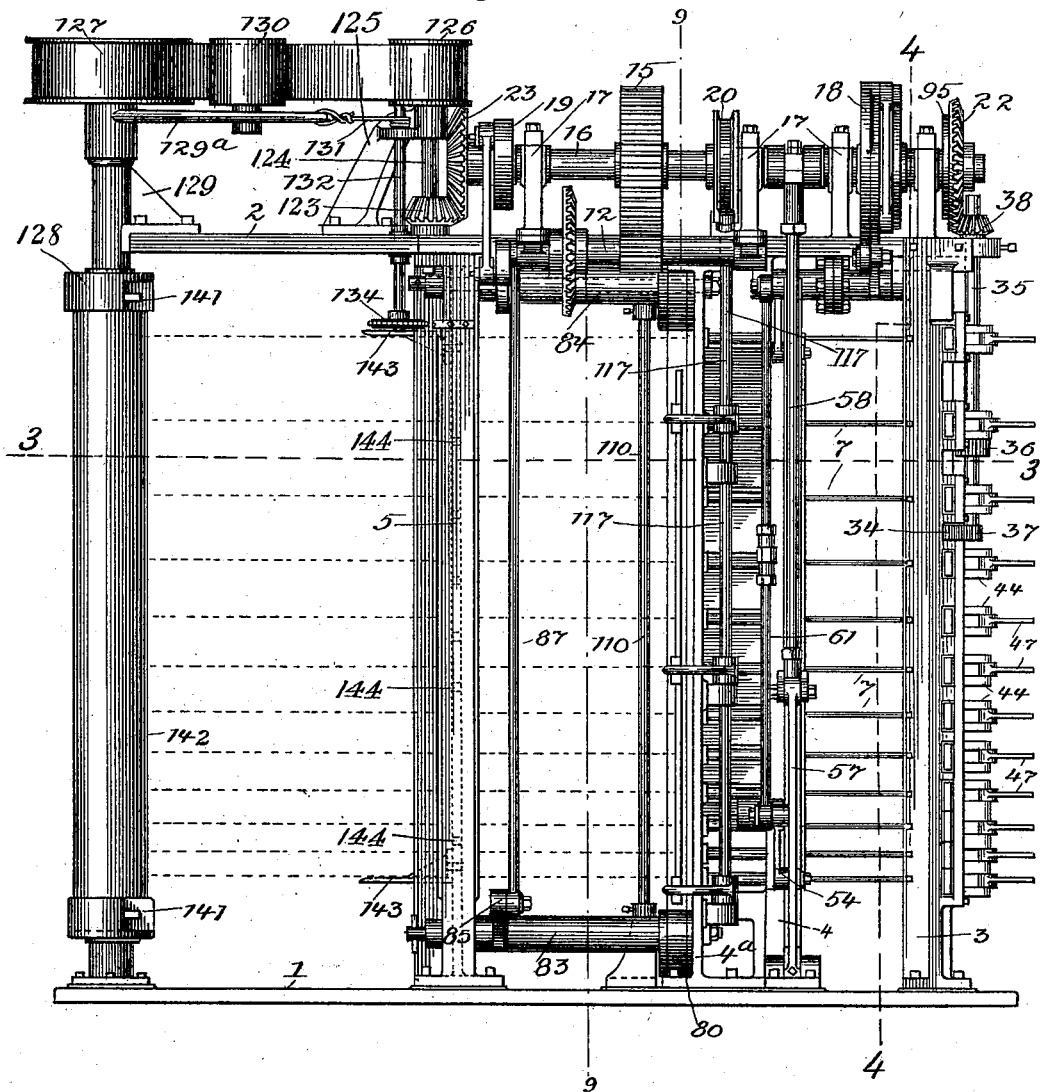

(No Model.) 11 Sheets—Sheet 3.
A. J. BATES.
MACHINE FOR MAKING WIRE FENCING.
No. 591,996. Patented Oct. 19, 1897.
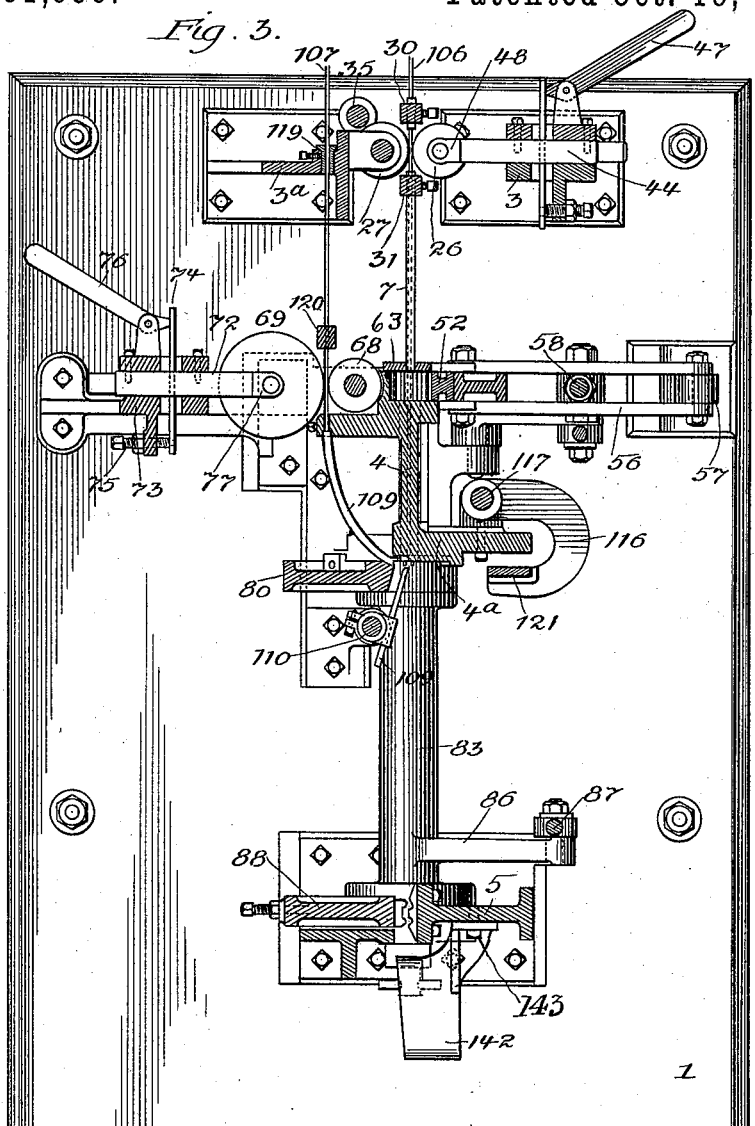
Witnesses:
Frank S. Blanchard
A. M. Parkins
Inventor
Albert J. Bates,
By Samuel Goldsborough,
Attorneys

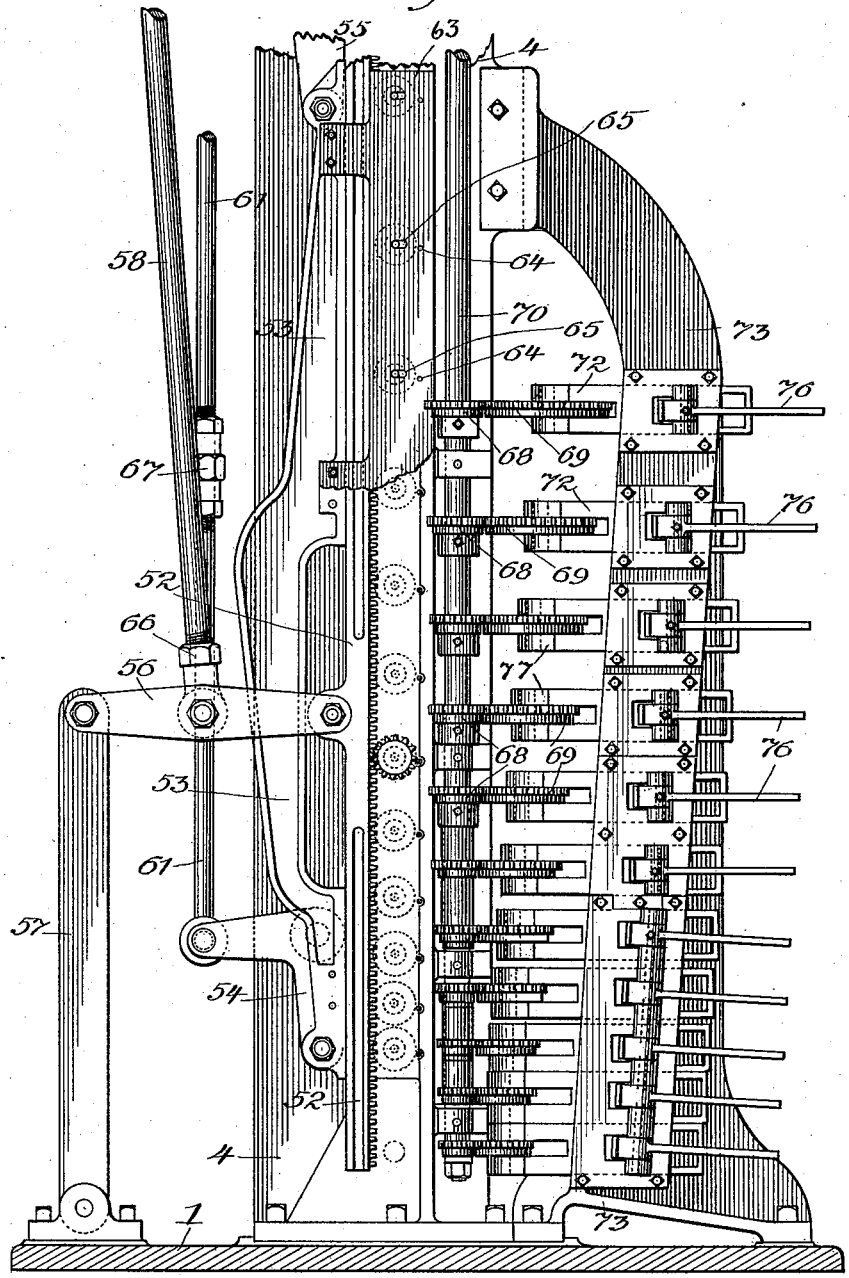

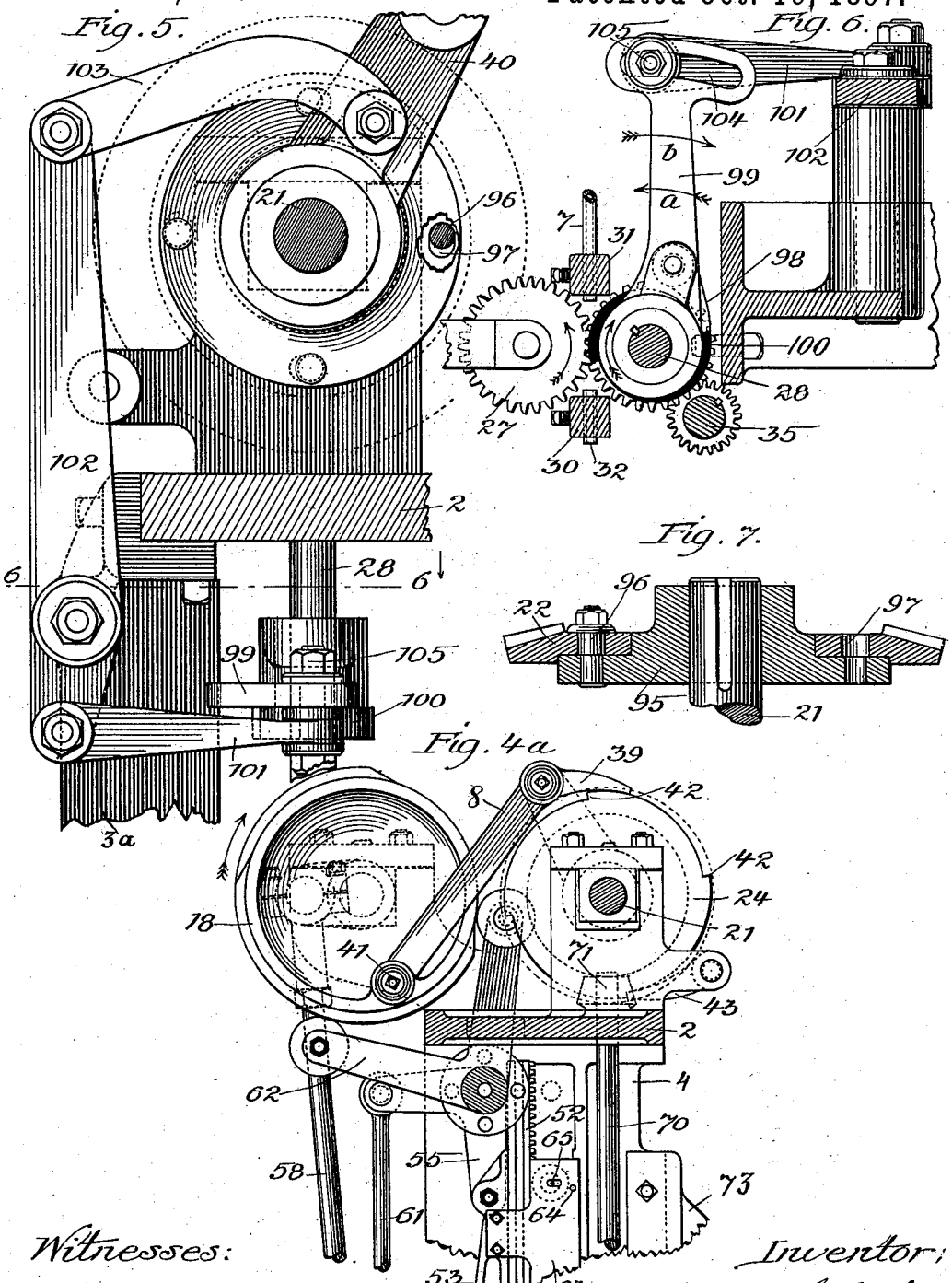

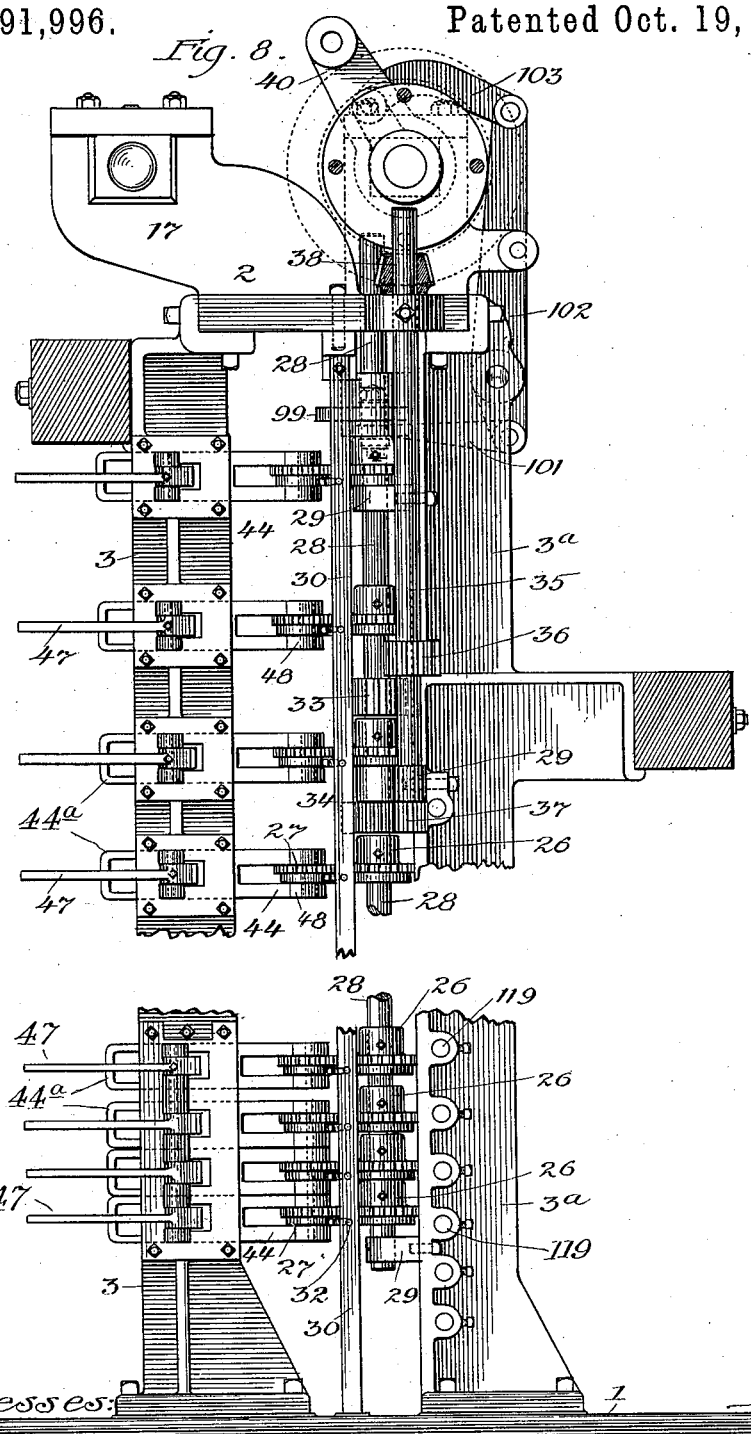

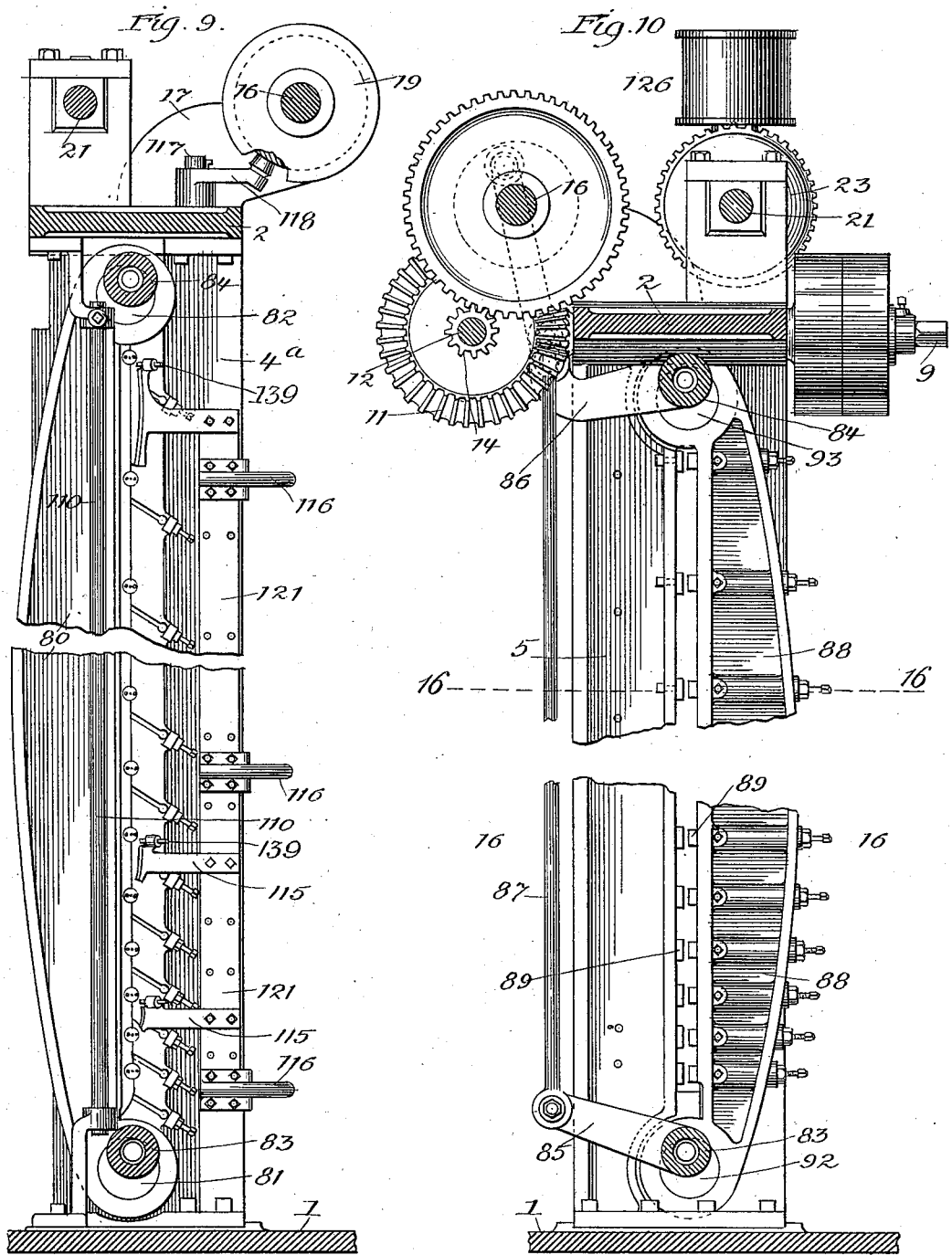

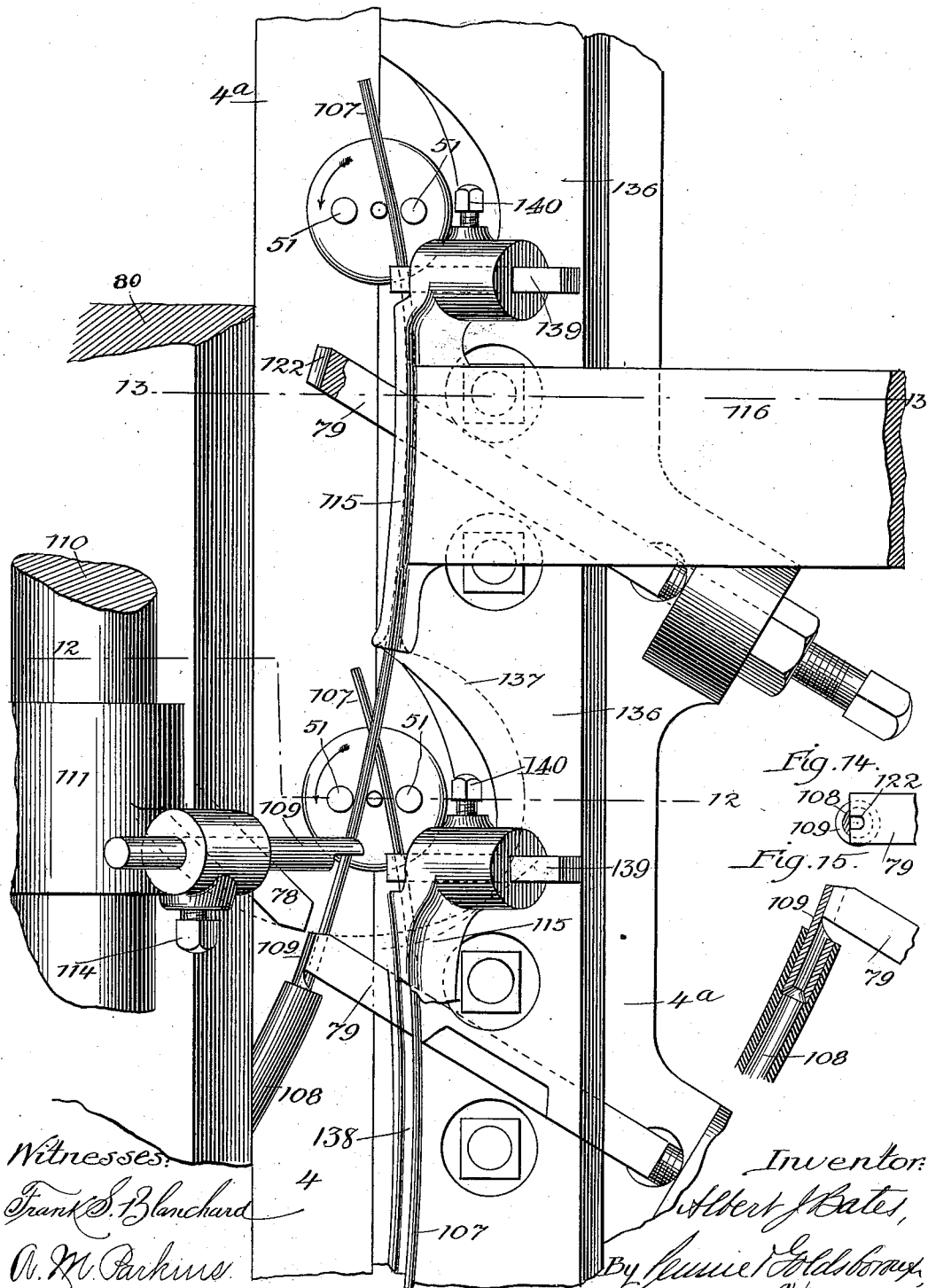

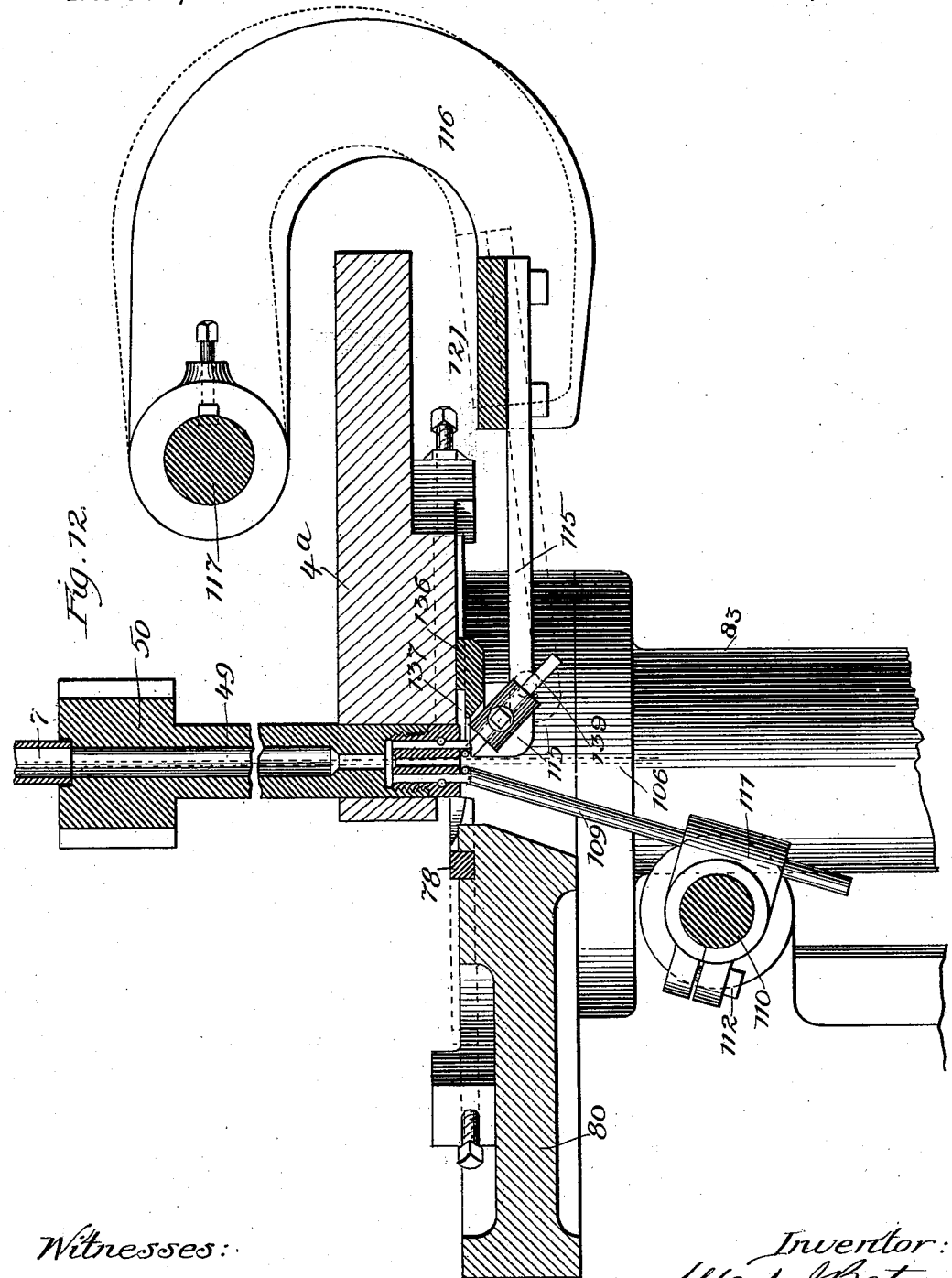

(No Model.) 11 Sheets—Sheet 10.
A. J. BATES.
MACHINE FOR MAKING WIRE FENCING.

No. 591,996. Patented Oct. 19, 1897.

Witnesses:
Frank S. Blanchard
A. M. Parkins

Inventor:
Albert J. Bates,
By Semmes & Goldsborough
Attorneys.

(No Model.) 11 Sheets—Sheet 11.
A. J. BATES.
MACHINE FOR MAKING WIRE FENCING.
No. 591,996. Patented Oct. 19, 1897.
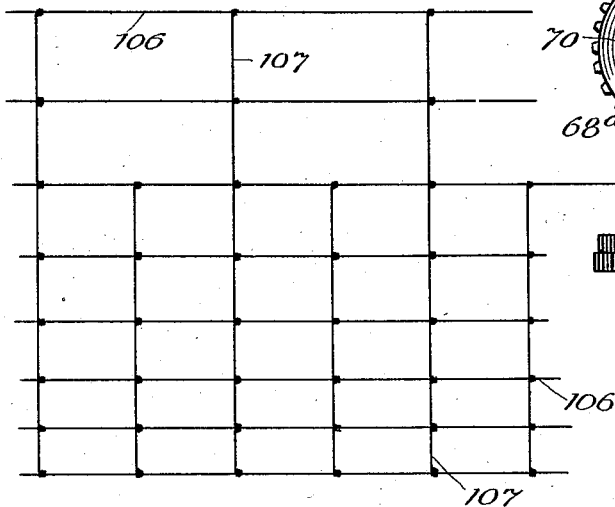
Fig. 17.
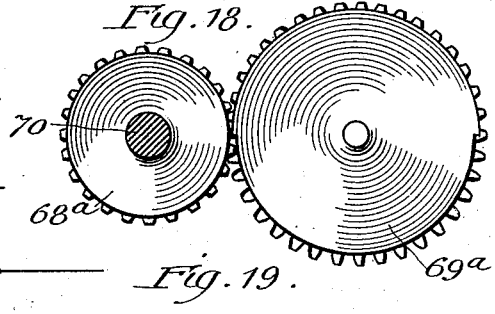
Fig. 18.
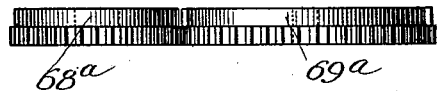
Fig. 19.
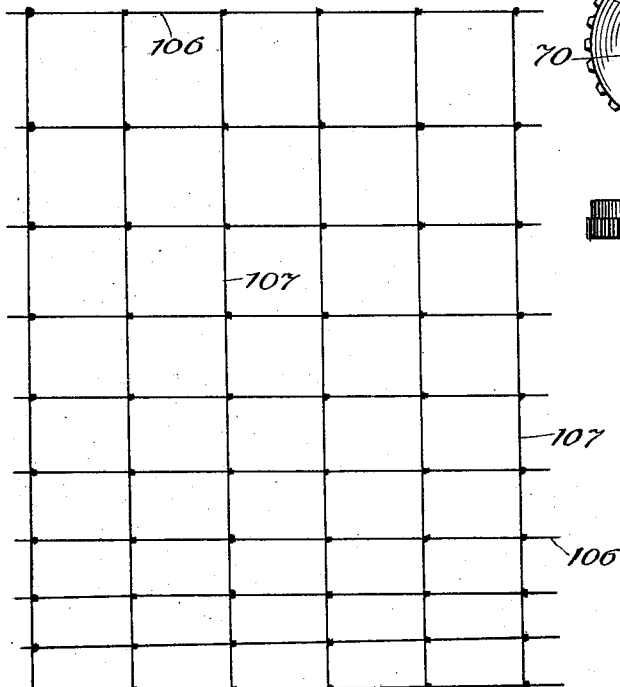
Fig. 20.
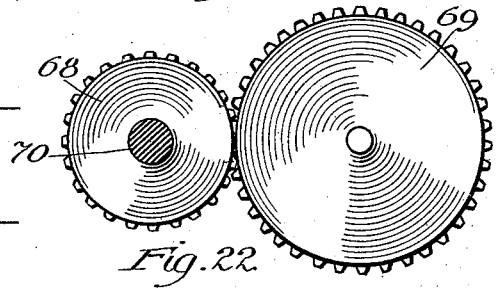
Fig. 21.
Fig. 22.
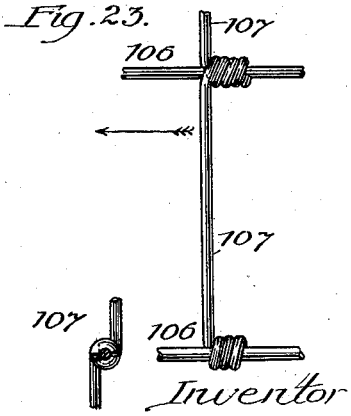
Fig. 23.
Witnesses:
Frank S. Blanchard
A. M. Parkins
Inventor
Albert J. Bates,
By Wenne & Goldsbrough,
Attorneys.
THE NORRIS PETERS CO., PHOTO-LITHO., WASHINGTON, D. C.

UNITED STATES PATENT OFFICE.

ALBERT J. BATES, OF JOLIET, ILLINOIS, ASSIGNOR TO THE CONSOLIDATED STEEL AND WIRE COMPANY, OF CHICAGO, ILLINOIS.

MACHINE FOR MAKING WIRE FENCING.

SPECIFICATION forming part of Letters Patent No. 591,996, dated October 19, 1897.

Application filed June 21, 1897. Serial No. 641,627. (No model.)

*To all whom it may concern:*

Be it known that I, ALBERT J. BATES, a citizen of the United States, residing at Joliet, in the county of Will and State of Illinois, have invented certain new and useful Improvements in Wire-Fence Machines; and I do hereby declare the following to be a full, clear, and exact description of the invention, such as will enable others skilled in the art to which it appertains to make and use the same.

In the patent granted to me February 23, 1897, No. 577,639, I have illustrated, described, and claimed an organized machine for the manufacture in continuous lengths at one operation of a completed fencing or fence fabric, said fabric consisting generally of a plurality of parallel longitudinal or strand wires spaced at suitable distances apart and having transverse stay wires or braces spanning the spaces between the strand-wires and self-secured thereto, said stay-wires consisting of short lengths of wire extending from one strand to the next and having their opposite ends coiled around adjacent strand-wires, and preferably intercoiled with each other, so that the stay-wires extend across the width of the fabric in continuous unbroken lines.

The present invention is designed as an improvement upon that of the former patent, and, while preserving the same general mode of operation and characteristic features of the other machine, is designed to embody the same in improved mechanisms with a view to obtaining greater stability and certainty of operation, to enhance the general efficiency of the machine, and to obtain a better product and increased output.

The principal points of difference between the present machine and that of the former patent are, first, the manner of feeding the strand-wires to the coilers, the same being pushed forward herein by positively-acting feed-rolls instead of being pulled through the coilers by take-up and tension rolls; second, the manner of handling the strand-wires while the coilers are twisting the stay-wires around them; third, the construction and operation of the stay-wire guides; fourth, the provision of means for regulating the tension on the fencing; fifth, the manner of crimping the strand-wires at the point of application of the stay-wires, and, sixth, certain structural details of minor importance that will be explained later on.

Figure 13:
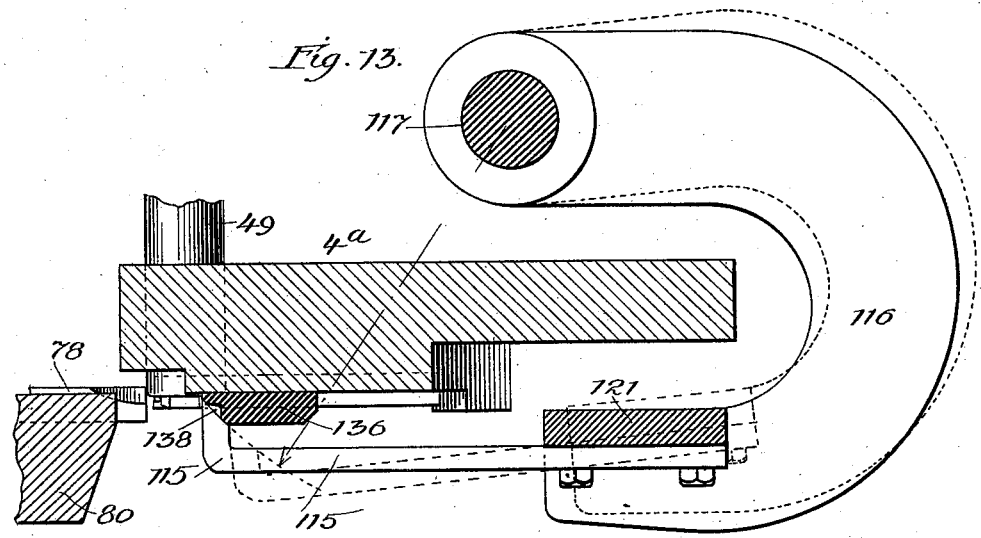
Figure 16:
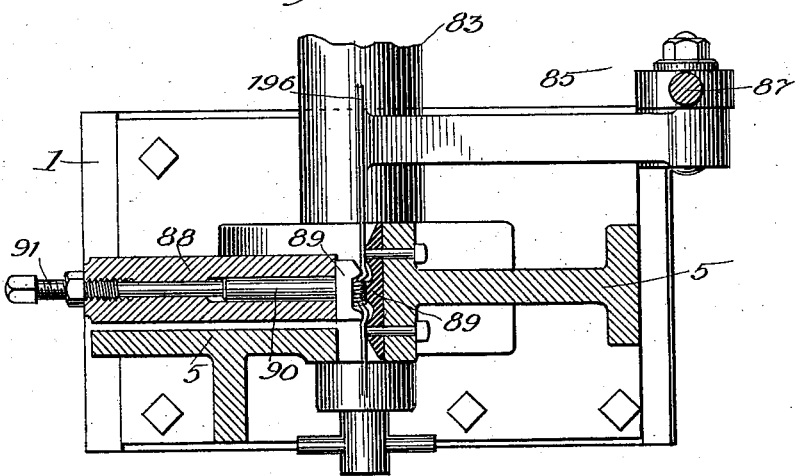

In the accompanying drawings, forming part of this specification, Figure 1 is a top plan view; Fig. 2, a side elevation; Fig. 3, a horizontal section on the line 3 3 of Fig. 2. Fig. 4 is a vertical cross-section on the line 4 4 of Figs. 1 and 2, the upper part of the machine being broken away and shown in Fig. 4ª, which is a similar view of the parts omitted from Fig. 4. Fig. 5 is a detail of the mechanism for giving the strand-wire-feed rolls an additional impulse to their regular feeding motion. Fig. 6 is a horizontal section of the same on the line 6 6 of Fig. 5. Fig. 7 is a section through the strand-wire feed-rolls-operating gear, showing its connection to its shaft. Fig. 8 is a front end elevation of the complete machine. Fig. 9 is a sectional elevation on the line 9 9 of Fig. 2, showing the cutter-bars and the guide-bar. Fig. 10 is a similar elevation reversed on the same line and showing the crimpers. Fig. 11 is a face view of a fragment of the machine, showing in elevation the relative arrangement of the coilers, the cutters, and the guides. Fig. 12 is a horizontal section on the line 12 12 of Fig. 11. Fig. 13 is a similar section on the line 13 13 of the same figure. Figs. 14 and 15 are details showing the relation of the guide-tubes to the fixed jaw of the cutters. Fig. 16 is a horizontal section on the line 16 16 of Fig. 10. Fig. 17 is a view showing one of the fence products of the machine. Figs. 18 and 19 are plan and edge views of the stay-wire-feed rolls used in making this product. Fig. 20 is a view of another product of the machine, and Figs. 21 and 22 are views of the stay-wire-feed rolls used in making this product. Fig. 23 is an enlarged detail showing the coils between the stay and strand wires and the direction of movement of the same through the machine.

The shafts, gearing, and other working parts are mounted on a suitable frame. The present invention is not particularly concerned with the construction of this framing; but a stable and convenient construction is shown in the drawings, where 1 denotes a bed-plate of generally rectangular form adapted to be anchored to any suitable foundation. 2 indicates a horizontal top plate supported above the bed-plate on standards rising therefrom, of which standards 3 3ᵃ are located side by side at the front of the machine and support the mechanism for introducing and forwarding the wires, 4 is located about centrally of the width of the bed-plate and back of 3 3ᵃ and supports the wire coiling, guiding, and cutting mechanisms, and 5 is located substantially in line with the standard 4 nearer the rear end of the machine. This top plate is of narrower width than the bed-plate, but of substantially the same length, and supports the shafts and gearing for driving the operating parts beneath. I will now describe this mechanism, referring particularly to Fig. 1.

Journaled in bearings in the top plate is the main shaft 9, having at one end the ordinary fast and loose pulleys by which it is driven, and at the other end a bevel-pinion 10, meshing with a bevel-wheel 11 on a counter-shaft 12, supported in brackets 13, overhanging the edge of the top plate. About centrally of this shaft there is a power-pinion 14, that meshes with a large spur-gear 15 on a shaft 16, journaled in stand-bearings 17, rising from the top plate. This shaft carries at the front end of the machine a cam and crank disk 18, from which motion is taken to operate the feeding and forwarding rolls, and at its opposite end a crank-disk 19 for operating the wire cutters and crimpers. At a point just back of the cam and crank disk 18 the shaft 16 has a crank 16ᵃ, and between this point and its gear 15 it carries a peripheral cam-disk 20, the crank and disk being, respectively, for the purpose of operating the coilers and the stay-wire guides.

Journaled in stand-bearings on the top plate at about the level of and parallel with the shaft 16 is a shaft 21, that extends from the front end of the machine, where it is provided with a bevel-gear 22 for driving the wire-feeding rolls, and extending toward the rear past the end of the shafts 9 and 16 and having at this end a bevel-gear 23 for driving the drum on which the completed fencing is wound. At a point just behind the feed-rolls-driving gear 22 this shaft is provided with a ratchet-disk 24, having four teeth, and farther back it has another bevel-gear 251, by means of which the shaft of the stay-wire-feeding rolls is operated.

From the train of shafts and gears above described the power to operate all the moving parts of the machine is derived, and it is distributed to the several mechanisms for feeding the strand and stay wires, guiding and cutting off and coiling the stay-wires, crimping the strand-wires, and reeling the completed fencing in the manner and by the means hereinafter described.

The mechanism for feeding the strand-wires differs radically from that of my former patent in that in the patented machine the tractive power of the drum on which the fencing was reeled was utilized to pull the strand-wires through the coilers. In the present machine, however, I obtain certain advantages in connection with the operation of the crimpers, and in the introduction of the strand-wires, as well as in the operation of splicing or replacing broken wires, by using driven rolls that grip the wires in advance of the coilers and act positively to forward them to and through said coilers by pushing instead of pulling. This feeding-in mechanism is as follows:

It being understood that the location and arrangement of the coilers in a vertical series one over the other is the same as in the patent before referred to, the strand-wire-feed rolls are denoted by 26 and 27. They are arranged in pairs, one for each coiler, and each pair consists of two coöperating flat-edged disks of equal diameter provided with intermeshing gears whereby one of the disks is driven by the other. The rolls 26 are the driving-rolls, and are arranged upon a vertical shaft 28, journaled at its upper end in a fixed bearing in the top plate, and mounted in bracket-bearings 29, projecting from the standard 3ᵃ. The rolls 27 are the driven ones, and are mounted in adjustable, yielding bearings in the standard 3, the construction of which bearings will be presently explained. The feed-rolls being thus constructed and mounted are arranged in a series, one over the other, in a vertical line in front of the line of coilers, one pair of such rolls being in the horizontal plane of each coiler, and the coilers being centrally alined with the space between the rolls. For the purpose of properly introducing the wires to these rolls as well as to have them properly started across the space intervening between the coilers and the rolls, I locate in front and rear of the line of rolls, on a line passing centrally between them, guide-posts 30 31, these posts being stepped in the bottom plate and secured to the top plate at their upper ends, and being provided with eyes 32 opposite each pair of rolls for the free passage of the wires. Leading from the post 31 across the intervening space to the coilers are guide-tubes 7, said tubes registering with the eyes 32 and having their opposite ends fitting into depressions in the coiler-pinions in line with the central bore of the coilers, the object being to insure the proper introduction of the ends of the wires into the coilers.

The shaft 28 on which the drivers 26 of the pairs of rolls are mounted is driven by differential gearing, the object being to regulate the distance apart that the stay-wires are coiled on the strand-wires by feeding in a greater or less length of the strand-wires at each actuation of the rolls. For this purpose the shaft 28 is provided with spur-pinions 33 34, the pitch diameter of the latter exceeding that of the former, and the shaft itself is driven by either of these pinions from a short shaft 35, journaled in bearings in the top plate and on the standard 3ª. The shaft 35 is provided with drive-pinions 36 37, the former adapted to mesh with the pinion 33 on shaft 28, and the latter with pinion 34.

The pinion 36 is of equal diameter with 33, and the pinion 37 is just one-half the diameter of 34, the relative diameters of the pinions 33, 34, 36, and 37 being such that when the feed-rolls are driven by the pinions 33 and 36 they will make one complete revolution for each rotation of shaft 35, and when the rolls are driven by the pinions 34 and 37 they will make one-half a revolution for each rotation of said shaft. The pinions 36 and 37 are so spaced apart on the shaft 35 that when one of them is in mesh with either of the pinions 33 34 the other will be disengaged and run free, and for the purpose of throwing these pinions into and out of gear the shaft is made longitudinally adjustable in its bearings, having a feather-and-groove connection with its driving-pinion that turns in a bearing on the top plate.

As before stated, the feed-rolls are driven from the bevel-gear 22. This gear meshes directly with the pinion 38 on the shaft 35, and gives the latter one turn for every actuation. The shaft 21 and gear 22 are operated intermittently, being given a quarter-turn at each actuation by means of a spring-pawl 39, that is carried by an arm 40, which is sleeved on shaft 21, so that the pawl rides on the periphery of the ratchet-disk 24 before described. The arm 40 is connected by means of a link 8 to a wrist-pin 41 on the side of the cam and crank disk 18, which is rotated continuously during the operation of the machine by the train of gears before described. The rotation of the disk 18 causes the arm 40 to oscillate, and, as the pawl 39 rides on the edge of the disk 24, it engages the ratchets or teeth 42, and, there being just four of these teeth, the shaft 21 and gear 22 are given a quarter-revolution for every oscillation of the arm. In order to prevent any possible rebound of the wheel 22 or danger of retrograde movement from any other cause, I provide a spring-pawl 43, that is studded to the frame and faces in the opposite direction to the pawl 39. This pawl falls in behind the ratchet-teeth 42 as the disk moves and locks and holds it against retrograde movement.

The object of mounting the driven strand-forwarding rolls 27 in adjustable and yielding bearings is to provide for throwing individual rolls out of action when it is desired to discontinue the feeding of any of the wires and to have them grip the wires when used by a yielding pressure. This is accomplished by mounting the rolls in the ends of slides 44, moving in guides in the standard 3, and providing springs 45, seated at one end of adjusting-screws 46 and passing through slots in the slides, the other ends of the springs bearing against the ends of cam-levers 47 and being tightened or loosened as the levers are swung to one side or the other. This construction also permits the entire removal of the rolls and slides by backing off the screws, detaching and pulling out the springs, and withdrawing the slides by the handles 44ª on their outer end, the rolls themselves having their journals in detachable pieces 48 at the inner ends of the slides.

As before stated, the arrangement of the coilers is the same as in my former patent, and the construction and manner of operating them is also the same, and, though no detail description of this part of the present machine may therefore be necessary, I deem it best to describe them in general terms, so that they may be fully understood in connection with the present strand-feeding rolls and the guiding and cutting mechanisms to be described later on.

49 denotes the coiling-shafts journaled in the standard 4 and arranged in a vertical line one over the other at such distances apart as it is desired to have the strand-wires, the spaces between these wires being preferably graduated, so as to be narrower toward the ground than in the upper part of the fence. The coiler-shafts are centrally bored for the passage of the wires, and provided at the entering end with pinions 50 and at the opposite end with coiler-heads having two pins 51, the action of which is well understood in the art. The coilers are so located that their pinions are in a vertical line at the front side of standard 4, and their coiling-heads and the pins 51 protrude slightly from the rear side of the standard, the central bore of each coiler standing in line with the guide-eyes in the vertical bars 30 31 and in a line passing centrally between the rolls 26 and 27.

The coilers are operated by rack 52, extending vertically in parallel relation to the line of coilers and supported by a bar 53, that is pivoted at its lower end to one arm of the bell-crank lever 54 and at its upper end to the corresponding arm of a similar lever 55. The rack is reciprocated in the supporting-bar by a lever 56, pivoted thereto at one end and having a similar connection at its other end with a fulcrum-rod 57, that swings on a pivot on the bed-plate. At a point midway of its length the 56 lever is connected to a rod 58, that extends up and is connected with the crank 16ª of the shaft 16. The bar is moved laterally toward and from the line of coilers, so as to carry the rack into and out of engagement with the pinions, and the timing of the rack-operating mechanism with the mechanism for moving the bar is such that the rack engages with the pinion on its upstroke and is disengaged on its downstroke. The rack is held in the bar by means of flanges 59, which have longitudinal ribs on them that take into grooves in the sides of the rack. In order to move the bar toward and from the line of coilers, the opposite arms of the bell-crank levers are tied together by rod 61, and the upper lever 55 is rigidly connected to a short shaft journaled on the under side of the top plate and having a forked lever 62 at its other end. The arms of lever 62 carry friction-rollers running on the periphery of the disk 18, the cams of which rock the arms and their shaft and keep them locked in position. This rocking of the lever 55 gives the lower lever 54 a corresponding movement, and the supporting-bar and rack move in and out, as already described. It is necessary that the coilers should be locked while the rack is disengaged, and this is effected by providing the supporting-bar with a plate 63, that extends across the end of the pinions and has pins 64, one for each coiler, on the opposite side of the pinions from the rack. The plate has elongated openings 65 opposite the central bore of the coilers, so that as the bar swings away from the coilers the pins 64 engage the pinions and lock and hold them until the rack returns.

The above construction and arrangement is substantially that of the former patent; but in the present machine I provide for adjusting the horizontal plane in which the rack reciprocates and make provision for adjusting the parallelism of the rack with the line of pinions. In the first instance I connect the link 58 with the lever 56 by an adjustable connection 66, and to adjust the parallelism of the rack I provide for varying the relative angular arrangement of the bell-crank-lever arms by connecting them together adjustably—for example, by a turnbuckle 67 in the rod 61.

The stay-wire-feeding mechanism is substantially the same as in my said patent, and consists of a series of pairs of forwarding-rolls 68 69 similar to those employed to feed the strand-wires. As the stay-wires correspond to the spaces between the strand-wires, there is one less pair of such feed-rolls than strand-wire rolls. These rolls are arranged in a vertical line, one pair over the other, at the side of the machine, but facing toward the front, so that the stay-wires may be fed in parallel with the strand-wires, an arrangement that economizes space in the mill.

68 are the driving-rolls and are mounted on a vertical shaft 70, that is journaled in the framing and carries a bevel-pinion 71 above the top plate by means of which the shaft is driven from the wheel 251 and given a complete revolution for each quarter-turn of the wheel.

69 are the driven rolls, and are operated in precisely the same way as the strand-wire rolls—that is to say, by intermeshing gears—but instead of being of equal diameter the drivers are just one-half the size of the driven rolls, and make a complete revolution for each one-half rotation of the driven ones. The purpose of this arrangement will be apparent from the description of a modified form of driven rolls that will follow shortly; but the increasing diameters of the pairs is rendered necessary by the increasing spaces between the strand-wires without regard to the particular construction of the rolls themselves. The rolls 69 are mounted in the ends of slides 72, supported in guides in a standard 73, which rises from the bed-plate at the side of the standard 4 and is bent out laterally at its upper part to accommodate the increasing size of the rolls and is then bent inward and bolted to the standard 4. The slides 72 are pressed normally inward by springs 74, that pass through slots in them, and the tension of the springs is adjusted by screws 75, and they and the rollers are thrown into and out of action by cam-ended levers similar to those used with the strand-wire rolls, and, as in the case of these strand-rolls, the driven ones 69 are journaled in detachable bearings 77, fitted in the ends of the slides, so that upon withdrawing the slides by means of their handles they may be removed and replaced with others.

It will be understood that any width of fence may be made on this machine. Figs. 17 and 20 show two styles of equal width, one having the stay-wires extending the full height of the fence, and the other having only every alternate stay-wire running the entire height. When making the latter form, the stay-wires near the top are fed in only half as often as those lower down, and the removability of the driven rolls 69 enables me to substitute others $69^a$ for them, having one-half of their peripheries cut away, as in Fig. 18, so that, although the drivers 68 always have a complete revolution, and the driven ones $69^a$ a half-revolution, only every other half-revolution of the latter acts on the wires, the cut-away part of the periphery failing to engage and forward the wires during the completion of the revolution. Such cut-away rolls are shown in Figs. 18 and 19, and Fig. 17 shows the fence product when these rolls are employed.

The operation of the cutters 78 79 is substantially the same as in my former patent. They are arranged a little below and practically flush with the coiler-heads, and are inclined to the line of the stay-wires, as shown in Fig. 11. The fixed cutters 78 are adjustably seated in grooves in the part $4^a$ of the standard 4, which constitutes the stationary cutter-bar, and the movable cutters 79 are carried in a laterally-movable bar that is mounted at its upper and lower ends on eccentrics 81 82 at corresponding ends of the two shafts 83 84. From these shafts project arms 85 86, and these arms are tied together by connecting-rod 87, so that when the upper shaft is rocked the lower one will move with it and both eccentrics will have exactly the same motion, thus carrying the movable cutter-bar and its knives toward and from the fixed bar and cutting the stay-wires at the proper time.

The mechanism for crimping the strand-wires at the intersection of the stay-wires consists of a stationary bar and a movable bar 88, each carrying crimping-jaws 89, shaped and adapted to straddle the stay-wires and coils and to bite the strand-wires on each side of the coils, as shown in Fig. 16. The standard 5 of the machine-frame constitutes the stationary bar, and the two are so located in line with the coilers that the wires pass straight through between them, and they are arranged edgewise to each other and parallel with the cutter-bars, in unison with which the movable bar is operated by similar mechanism from the shafts 83 84. These crimper-bars and their operating mechanism are best shown in Fig. 10, and the construction and manner of mounting the crimper-jaws is illustrated in Fig. 16, where the inner edge of the standard 5 is widened out to allow the stationary jaws to be bolted thereto, and the movable bar 88 is shown bored out at intervals to receive the stems 90 of the movable jaws, said jaws being adjustable by means of set-screws 91. At its opposite ends the movable bar 88 is mounted on eccentrics 92 93 on the opposite ends of the shafts 83 84 from the eccentrics that operate the movable cutter-bar. The upper arm 86 of the shaft 84 is connected by means of a link 94 with the wrist of the crank-disk 19 on the continuously-rotated shaft 16. The rocking of the shafts 83 84 causes the eccentrics 92 93 to carry the movable bar toward and from the edge of the standard 5, which constitutes the fixed bar, and the timing of the operation is such that the jaws close together just as a line of stay-wires is passing between the jaws.

The arrow in Fig. 23 indicates the direction of travel of the strand-wires through the machine, and the position of the coils with respect to the stay-wires and the motion of the strand-wires. It will be understood that the stay-wires are flush with the heads of the coilers when the latter begin to operate, and as there is no room for the formation of the coils between the stays and the coilers, and the strand-wires being stationary at the time of coiling, they would be irregularly laid and pile up unless some provision were made for room at this point. I provide for this by giving the strand-wires a slight advancing movement separate from and in addition to the regular movement imparted by the feed-rolls, the extent of this movement being only sufficient to prevent the overrolling of the coils and insure their being laid flush with each other. Obviously the important thing in this connection is to have a slight relative movement between the head of the coilers and the stay-wires, and an absolute advance of the strand-wires would not be necessary providing the coilers were yieldingly held up to their work by springs that would allow them to back off as the coils are wound, and my present invention contemplates this feature boardly. I prefer, however, to give the strand-wires, and of course the stay-wires that are at the time partially coiled around them, an actual forward movement, and for this purpose I connect the gear 22 with its shaft 21 by bolting it to the side of a disk 95 that is rigid with the shaft, the bolts 96 passing through elongated holes 97 in either the gear or the disk, so as to permit the shaft 28 of the feed-rolls, which is always in mesh with the gear 22, to move forward slightly and carry the gear with it. The additional movement of the shaft 28 is obtained by a spring-pawl 98, carried by an arm 99, that is loosely sleeved on the shaft and engages a ratchet-disk 100, fast on the latter near its upper end and having two teeth. This pawl-carrying arm is connected by link 101 with the lower end of a léver 102, pivoted to a bracket on the top plate, the upper end of which lever is connected by a similar link 103 to the oscillating arm 40 on the shaft 21. The connection of the link 101 with the pawl-arm 99 is adjustable by the slot and bolt 104 105, so as to vary the throw of the arm and the location of the arc through which the pawl moves. As will be understood from following out the gearing, the shaft 28 is moved in the direction of the arrow by the wheel 22, and at this time the pawl 98 slips idly over the edge of the ratchet-disk 100, the arm 99 moving in the direction of the arrow $a$. When the wheel 22 stops and the arm 40 recedes for its pawl to catch a new tooth 42, the arm 99 moves in the direction of the arrow $b$, engaging the teeth of the ratchet 100, and turning the shaft 28 in the same direction as it was formerly turned by the gear 22, the slot-and-bolt connection between this gear and the disk 95 permitting this motion independently of the shaft 21.

The stay-wires are guided to the coilers as follows: 106 denotes the strand-wires and 107 the stay-wires. Both sets are fed in at the front of the machine parallel with each other. The strand-wires pass through the machine in a practically straight line, but the stay-wires after passing through guides 119 in standard $3^a$, through supplemental guides 120 in front of the rolls 68 69, pass through the rolls and enter guide-tubes 108, that curve laterally and extend from just back of the rolls to a point immediately below the fixed cutter 79. Their purpose is to deliver the wires transversely to the strand-wires and present them accurately to the coilers. As shown in Fig. 11, the coilers stop with their pins on a horizontal line, and each stay-wire must be fed to them so as to pass on one side of the strand-wire in one coiler and the opposite side of the wire in the coiler next above, and always between said strand-wires and one of the coiling-pins, and each wire passes from a point below one coiler to a point above the upper coiler, so that, as to each coiler except the top and bottom ones, the wires stand as indicated in Fig. 11, with their ends overlapped at the coilers. The successful operation of the machine depends largely upon the accurate delivery and holding of these wires up to the coiler-heads, so that the pins may not fail to engage and coil around them the strand-wires. In order to form these coils, it is necessary to have something over an inch of wire above and below the pins, and this necessitates the location of the cutters some distance below the heads, and the tubes 108 cannot of course extend above the cutters. It is desirable to have the ends of these tubes come nearly flush with the top of the fixed cutter, in order to prevent the drag of the movable cutter on the back stroke from bending the protruding uncut ends. I therefore secure in the end of each tube 108 a short tube 109 of hardened steel, and pass this up through a groove 122 in the end of the fixed cutter until flush or nearly so with its upper surface, so that the uncut end protruding from the tube proper is braced and supported against the dragging of the movable cutter.

While the stay-wires are being fed from one coiler to the next, the strand-wires are passing through the coilers, and, should the ends of the stay-wires as they issue from the tubes 108 strike the moving strand-wires, there would be a liability of said wires being deflected away from the coiler-head which might cause the pins 51 to miss them and fail to make the coil. To prevent this, I provide a supplemental guide 109, which fits up close to the head of each coiler on one side of a line passing vertically through the series at a point between the strand-wire and the cutters, but not in a position to interfere with the rotation of the pins. These guides are grooved on their under sides, and the stay-wires as they come from the tube 108 and before they are cut pass between them and the heads and are securely held there until the coiler-pins draw them out. The guides 109 are mounted on a rod 110, that extends the length of the line of coilers, and they are secured to said rod by sleeves 111, adjustable up and down and around on the rod and held by clamp-screws 112, and the guides themselves are adjustable in and out in the sleeves 111 by means of set-screws 114. On the opposite side of the line of coilers, the guides for directing the stay-wires across the intervening space between them and holding the body portion of the wires while the coils are being started are located, and, as the stay-wires when coiled move along with the strand-wires, these guides must release them and move out of their way. The guides are numbered 115, and are located one between each pair of coilers. They are mounted on a bar 121, carried on the ends of arms 116, secured to a shaft 117, and are bent like goosenecks, so as to get around the part 4ᵃ of the standard 4, the shaft being on one side and the guides on the other. The shaft has a crank 118 on its upper end and is rocked to and fro by a peripheral cam 20 on the rotating shaft 16, so as to open the guides just after the coils have taken a sufficient grip on the strand-wires to hold them securely.

Extending vertically along the standard 4ᵃ at the sides of the coilers, there is bolted a series of plates 136, extending from coiler to coiler and serving to clamp the fixed cutters in their grooves, and each plate is hollowed out on its inner side opposite the coiler-heads, as indicated in 137 in Figs. 11 and 12, to allow the ends of the stay-wires to sweep around. Between the coilers the plates are provided with guide-grooves 138, into which the stay-wires pass on their way from one coiler to the next, and the grooves have the same general curvature of the tubes 108, so that the wires are delivered to the coilers slightly bowed outwardly, as shown in Fig. 11, and the upper ends of the guide-grooves stand in a position to direct the stay-wires accurately between the strand-wire and the pin on the opposite side of the coiler from that inside of which it passed to the coiler below. The movable guides 115 overlie these grooves and are curved to correspond with them, so that in their normal position they form with the grooves closed guideways for the wires extending from one coiler to the next. At their upper ends these movable guides carry fingers 139, that are adjustable by means of set-screws 140 and have their inner ends located in close proximity to the coilers on the opposite of the vertical line of the strand-wires from the guides 109. The position of the fingers corresponds approximately to that of the guides 109 on the opposite side of the coilers, and they coöperate with these guides in holding the wires, one holding the upper end of one strand and the other the lower end of the strand above.

The former patented devices for winding the fencing on the drum are improved in this machine by the addition of means for regulating the tension on the fabric to correspond with the increasing diameter of the roll. This is important in the present machine, for the reason that the strand-wires are pushed through the coilers, cutters, and crimpers by the feed-rolls from a point at the front of the machine, and no take-up or tension rolls are employed between the coilers and the drum. This mechanism consists of the gear-wheel 23 on the shaft 21 meshing with a bevel-pinion 123 on a short shaft 124, journaled in a bracket 125, rising from the top plate. At the top of this shaft there is a belt-roller 126, around which a belt is thrown to a similar roller 127 on the end of the shaft of the drum-head 128. This shaft is journaled in a bracket 129, and sleeved upon it just under the belt-roller is an arm 129ᵃ, that trends backwardly in the general direction of the belt and carries a tension-roller 130, over which the belt also runs. The free end of this arm is connected by a cord or rope 131 to an adjusting-shaft 132, journaled in the top plate and the bracket 125. At its lower end this shaft has a hand-wheel and ratchet 134, by which it is turned to wind or unwind the rope 131 and increase or diminish the pressure of the roller on the belt, which, as will be understood, gives the roller 126 a regulable power to drive the winding-drum, and thus enables the attendant to control the tension on the fencing. A spring-pawl 135 is arranged to engage the teeth of the ratchet-wheel to lock the parts in any position of adjustment.

As the fence fabric passes through the crimpers, it is important that the strand-wires should be kept always within the width, vertically, of the crimper-jaws, and, as these jaws are located only at intervals along the vertically-disposed crimper-bars, I provide guides 142, secured to the standard 5 by screw-bolts and nuts 143, said nuts being adapted to fit in any one of the series of holes 144 in the standard, as indicated in Figs. 2 and 3. These guides are located near the upper and lower ends of the standard and project beyond the same in the line of the moving wires, and engage the top and bottom border-wires of the fencing, and guide and hold the same and the intermediate strand-wires within reach of the crimper-jaws. Owing to the fact that the crimpers are located some distance from the coilers, and the further fact that the strand-wires are pushed through the coilers from a point still farther removed from the crimpers, these guides are important to prevent the crimper-jaws from missing the coils due to buckling or disarrangement of the strand-wires from other cause. The guides are adjustable up and down on the standard, according to the width of fencing desired.

The construction and arrangement of parts being as thus described, the operation of the machine needs no further explanation except to state generally that the strand and stay wires are fed in parallel and simultaneously with each other and by a step-and-step motion, both sets of feed-rolls intermitting their action while the coilers are at work. The strand-wires rest while the knives are cutting the stay-wires, and, just after the coilers start, the rolls that feed these wires are given the additional movement previously described for slightly further advancing them, when there is another pause in the passage of these wires before the next actuation of the rolls. During this additional movement of the strand-wires the stay-wire-feed rolls are stationary; but the cut lengths of these wires being at this time partially coiled around the strand-wires partake bodily of the slight forward advance of the latter, the movable guides 115 opening to release them as soon as the coiling operation is fairly under way. After the coiling of one set of stay-wires is finished, both sets of rolls are again actuated to feed in another length of strand and stay wires, that part of the fencing previously acted on by the coilers passing on to the crimpers, whence it proceeds to the winding-drum by the successive actuations of the feed-rolls. Successive repetitions of these operations complete the fencing already reeled for the market, and when the desired length has been wound on the drum the locking-keys 141 are removed from the drum-heads and the sections 142 with the bundle of fencing are lifted out, after which all that is necessary to start the machine again is to pull out the sections from the bundle and replace and lock them in the heads.

What I claim, and desire to secure, is as follows:

1. In a wire-fence machine, the combination of a plurality of coilers through which parallel strand-wires are fed to have the ends of stay-wires coiled around them, mechanism for simultaneously feeding a plurality of stay-wires to the coilers at intervals and cutting off suitable lengths thereof to span the spaces between contiguous strand-wires in line with one another, and strand-wire-feeding mechanism acting upon the wires in advance of the coilers and cutting mechanism, and operating to intermittently push said wires forward through the machine.

2. In a wire-fence machine, the combination of a plurality of coilers through which parallel strand-wires are fed to have the ends of stay-wires coiled around them, driven rolls for simultaneously feeding a plurality of said stay-wires to the coilers, mechanism for cutting off suitable lengths of said stay-wires to span the spaces between contiguous strand-wires in line with one another, and intermittently-acting driven rolls located in advance of the coilers and acting to push said wires forward through the machine.

3. In a wire-fence machine, the combination of a plurality of pairs of positively-driven feed-rolls arranged in a line one over another, bars extending the length of said line of rolls in front and rear of the same, and guide-eyes in said bars centrally alined with the space between the rolls of each pair.

4. In a wire-fence machine, the combination of a plurality of pairs of positively-driven feed-rolls arranged in a line one over another, a plurality of coilers arranged in a line paralled with the line of feed-rolls in rear of the same, bars extending the length of the line of rolls in front and rear of the same, guide-eyes in said bars centrally alined with the space between the rolls of each pair, and guide-tubes extending from the eyes of the rear bar to the coilers.

5. In a wire-fence machine, the combination to form pairs of coöperating wire-feed rolls of a driver secured to a rotary shaft, and a driven roll intergeared therewith, said driven roll being mounted in bearings in a bar sliding in ways in the framing of the machine and removable therefrom.

6. In a wire-fence machine, the combination to form pairs of coöperating wire-feed rolls of a driver secured to a rotary shaft, and a driven roll intergeared therewith, said driven roll being mounted in bearings in a bar sliding in ways in the framing of the machine, and having an adjustable spring acting to force the same inward so as to hold the rolls in operative relation by a yielding pressure.

7. In a wire-fence machine, the combination to form pairs of coöperating wire-feed rolls of a driver secured to a rotary shaft, and a driven roll intergeared therewith, said driven roll being mounted in bearings in a bar sliding in ways in the framing of the machine, an adjustable spring acting to force the same inward so as to hold the rolls in operative relation, and a cam-lever for throwing the spring into and out of action.

8. In a wire-fence machine, the combination to form pairs of coöperating wire-feed rolls of a driver secured to a rotary shaft, and a driven roll intergeared therewith, said driven roll being mounted in removable bearings in the end of the bar sliding in ways in the framing of the machine and pressed inwardly by a spring to hold the rollers in operative relation.

9. In a wire-fence machine, the combination of coilers through which parallel strand-wires are fed, mechanism located in advance of the coilers for forwarding said strand-wires thereto, mechanism for feeding stay-wires to the coilers to be cut into lengths and coiled around the strand-wires, a driven winding-drum upon which the completed fencing is wound, and mechanism for regulating the tension on the fencing.

10. In a wire-fence machine, the combination of coilers through which parallel strand-wires are fed, mechanism located in advance of the coilers for intermittently forwarding said strand-wires thereto, mechanism for intermittently feeding stay-wires to the coilers to be cut into lengths and coiled around the strand-wires, a winding-drum upon which the completed fencing is wound, an intermittently-driven belt-roller for rotating the drum, a belt-roller on the drum-shaft and an adjustable regulator for the belt to control the tension on the roll of fencing as its diameter increases.

11. In a wire-fence machine, the combination of mechanism for intermittently feeding a plurality of strand-wires, mechanism for intermittently feeding a plurality of stay-wires transversely to the strand-wire, mechanism for cutting off suitable lengths of the stay-wires to span the spaces between the strand-wires, mechanism for coiling the adjacent ends of the stay-wires around the strand-wires, and mechanism for effecting a slight longitudinal movement between the coilers and the strand-wires during the operation of coiling the stay-wires around the strand-wires.

12. In a wire-fence machine, the combination of mechanism for intermittently feeding a plurality of strand-wires, mechanism for intermittently feeding a plurality of stay-wires transversely to the strand-wires, mechanism for cutting off suitable lengths of stay-wires to span the spaces between the strand-wires, mechanism for coiling the adjacent ends of the stay-wires around the strand-wires, and mechanism for imparting to the strand-wires a slight additional movement through the coilers during the operation of coiling the ends of the stay-wires around them.

13. In a wire-fence machine, the combination of a plurality of coilers, mechanism for forwarding strand-wires to the coilers, mechanism for feeding a plurality of stay-wires transversely to the strand-wires, mechanism for cutting off suitable lengths of stay-wires to span the spaces between the strand-wires, and mechanism for coiling the ends of the stay-wires around the strand-wires, the strand-wire-forwarding mechanism acting to advance the wires with a step-by-step motion between the operations of the coilers, and being given an additional movement to slightly advance them during the operation of the coilers.

14. In a wire-fence machine, the combination of a plurality of coilers, driven rolls for feeding strand-wires to the coilers, driven rolls for feeding stay-wires transversely to the strand-wires, mechanism for cutting off suitable lengths of stay-wires to span the spaces between the strand-wires, mechanism for coiling the ends of the stay-wires around the strand-wires, said strand and stay wire feeding rolls being actuated intermittently to forward the wires during the intervals between the action of the coilers and to intermit their action during the coiling operation, and mechanism for giving the strand-wire-feed rolls an additional impulse during the coiling operation to impart a slight advance to said wires while the coiling is going on.

15. In a wire-fence machine, the combination of mechanism for feeding strand-wires to a plurality of coilers, mechanism for feeding stay-wires to said coilers and cutting off suitable lengths to span the spaces between the strand-wires, mechanism for operating the coilers to wrap the ends of the stay-wires around the strand-wires, and mechanism for crimping the strand-wires at the junction of the stay-wires, said mechanism consisting of a stationary bar and a movable bar between which the completed fencing passes from the coilers, said bars carrying crimping-jaws adapted to bite the strand-wires on either side of the coils of the stay-wires.

16. In a wire-fence machine, the combination of fixed and movable crimper-bars carrying jaws for crimping the strand-wires, said movable bar being mounted on eccentrics at its opposite ends, a connecting-rod between the arms of the shaft of the eccentrics, and a link connecting the upper arm with a crank-disk 19 on the shaft 16.

17. In a wire-fence machine, the combination of the shafts 83, 84, the eccentrics 81, 82, 92, 93, on opposite ends of said shafts, the arms 85, 86 projecting from one end of said shaft and tied together by the connecting-rod 87, the movable bars of the cutting and crimping mechanisms mounted on said eccentrics, and means for oscillating the shafts.

18. In a wire-fence machine, the combination of mechanism for feeding a plurality of strand-wires, mechanism for feeding stay-wires corresponding to the spaces between strand-wires and cutting and coiling the same around the strand-wires, reciprocating crimping-bars between which the completed fencing passes, said bars having jaws adapted to crimp the strand-wires on either side of the coils, and guides for the upper and lower edges of the fencing whereby the moving strand-wires are kept within the width of the crimping-jaws.

19. In a wire-fence machine, the combination of mechanism for feeding a plurality of strand-wires, mechanism for feeding stay-wires corresponding to the spaces between the strand-wires and cutting and coiling the same around the strand-wires, reciprocating crimping-bars between which the completed fencing passes, said bars having jaws adapted to crimp the strand-wires on either side of the coils, and guides located beyond the bars for acting on the upper and lower edges of the fencing to guide and hold the moving strand-wires within the width of the crimper-jaws, said guides being adjustable to different widths of fencing.

20. In a wire-fence machine, the combination of a plurality of coilers arranged in a line with one another, a gear-rack for rotating said coilers, said rack being supported in parallel relation with the line of coilers by pivoted levers, and mechanism for adjusting the angular relation of the levers, whereby the parallelism of the rack-bar with the line of coilers is determined and preserved.

21. In a wire-fence machine, the combination of a plurality of coilers arranged in line one over another and parallel with each other, a gear-rack for rotating said coilers arranged parallel with said line, an oscillating lever connected to said rack to reciprocate the same, a connecting-rod extending from said lever to an operating-crank, and means for adjusting the position of the lever to regulate the path of movement of the rack and the rotation of the coilers.

22. In a wire-fence machine, the combination of the shafts of the strand and stay wire feed rolls, the shaft 21 by means of which said feed-roll shafts are driven in unison, the ratchet-disk 24 on the shaft 21, the oscillating arm 40 carrying the spring-pawl 39, and the spring-pawl 43 for locking the disk against retrograde movement.

23. The combination of the shaft 21, the disk 95 secured thereto, and the gear-wheel 22 secured to said disk by bolts passing through elongated slots to allow a slight movement of the wheel independently of the shaft.

24. In a wire-fence machine, the combination of the strand-wire-feed-roll shaft, the shaft 35 parallel therewith, and differential gearing between said shafts, the shaft 35 being longitudinally adjustable to change the engagement of the gears.

25. The combination of the shaft 28 having pinions 33, 34, and the parallel adjustable shaft 35 having pinions 36, 37, the pinions 33 and 36 being of equal size, and the pinions 34 being twice the diameter of the pinion 37.

26. In a wire-fence machine, the combination of a plurality of coilers through which longitudinal strand-wires are fed, guides located and arranged between the coilers for directing the stay-wires across the intervening space from one coiler to the next, cutters for cutting the stay-wires after they have been projected through the guides, and mechanism for opening the guides to release the stay-wires after the coiling operation is begun.

27. In a wire-fence machine, the combination of a plurality of coilers through which longitudinal strand-wires are fed, guide-grooves extending across the intervening space from one coiler to the next, movable guides located between the coilers and normally closing said grooves, and mechanism for opening the movable guides to expose the grooves and release the stay-wires after the coiling operation begins.

28. In a wire-fence machine, the combination of the movable stay-wire guides, the horizontally-swinging arms 116 upon which said parts are mounted, the vertical shaft 117 having a crank at its upper end, and a rotary cam-wheel 19 for oscillating the shaft and arms to open and close the guides.

29. In a wire-fence machine, the combination of a coiler adapted for the passage therethrough of a strand-wire around which the coiler-pins are to wrap a stay-wire, a guide-tube terminating below the coiler for directing the stay-wire between the strand-wire and the coiler-pins, and a supplemental guide located between the end of the tube and the pins to prevent the moving strand-wire from deflecting the stay-wire.

30. In a wire-fence machine, the combination of a coiler adapted for the passage therethrough of a strand-wire around which the coiler-pins are to wrap a stay-wire, a guide-finger located in close proximity to the face of the coiler to hold the stay-wire up to the coiling-pins, and mechanism for moving the finger away from the coiler after the pins have engaged the wire.

31. In a wire-fence machine, the combination of a vertical line of coilers through which strand-wires pass, mechanism for directing stay-wires to the coilers, guide-tubes terminating below the coilers for guiding the stay-wires between the strand-wire and the coiling-pins, and a post secured to the frame and carrying supplemental guides 109 extending to a point on the coiler-heads between the tubes and the pins, said guides being adjustable laterally and vertically on the rod.

32. In a wire-fence machine, the combination of a coiler centrally through which a strand-wire passes to have the overlapping ends of two stay-wires coiled around it, said coiler standing to receive the stay-wires with its pins at right angles to the general direction of the stay-wires, means for feeding said stay-wires, and two guides located in such proximity and relation to the coiler-heads that one will direct one stay-wire between the strand-wire and one of the pins, and the other will direct the other stay-wire between the strand-wire and the opposite pin.

33. In a wire-fence machine, the combination of a coiler through which a strand-wire passes, mechanism for feeding a stay-wire to said coiler, cutters located below the coiler and consisting of fixed and movable knives, and a guide-tube for directing the stay-wire past the cutters to the coilers, the end of the tube being flush with the upper surface of the fixed knife to prevent the drag of the retreating knife from bending back the uncut end of the wire.

34. In a wire-fence machine, the combination of the frame-standards 3, 3ª, the standard 4 arranged in rear thereof and carrying the coilers, the standard 73 located at one side of the frame and carrying the stay-wire-feed rolls, guide-eyes 119 in the standard 3ª for directing the stay-wires to said rolls, and supplemental guides 120 immediately in front of said rolls and in line with the eyes in the standard 3ª.

35. In a wire-fence machine, the combination of the frame including base and top plates and vertical standards supporting the operating parts, of a vertical line of coilers, vertically-arranged driven feed-rolls in front of the coilers for forwarding strand-wires thereto, a vertical line of driven rolls for feeding transverse stay-wires to the coilers, a vertically-reciprocating rack for operating the coilers, horizontally-reciprocating crimpers in rear of the coilers, and through which the strand-wires with the stay-wires attached are fed, and a vertically-arranged winding-drum in line with the strand-wire-feed rolls and the coilers and crimpers, whereby the wires are fed straight through the machine and free access is allowed to the operating parts from both sides.

In testimony whereof I affix my signature in presence of two witnesses.

ALBERT J. BATES.

Witnesses:
J. A. GOLDSBOROUGH,
CHARLES D. CLARK.